UNITED STATES PATENT OFFICE.

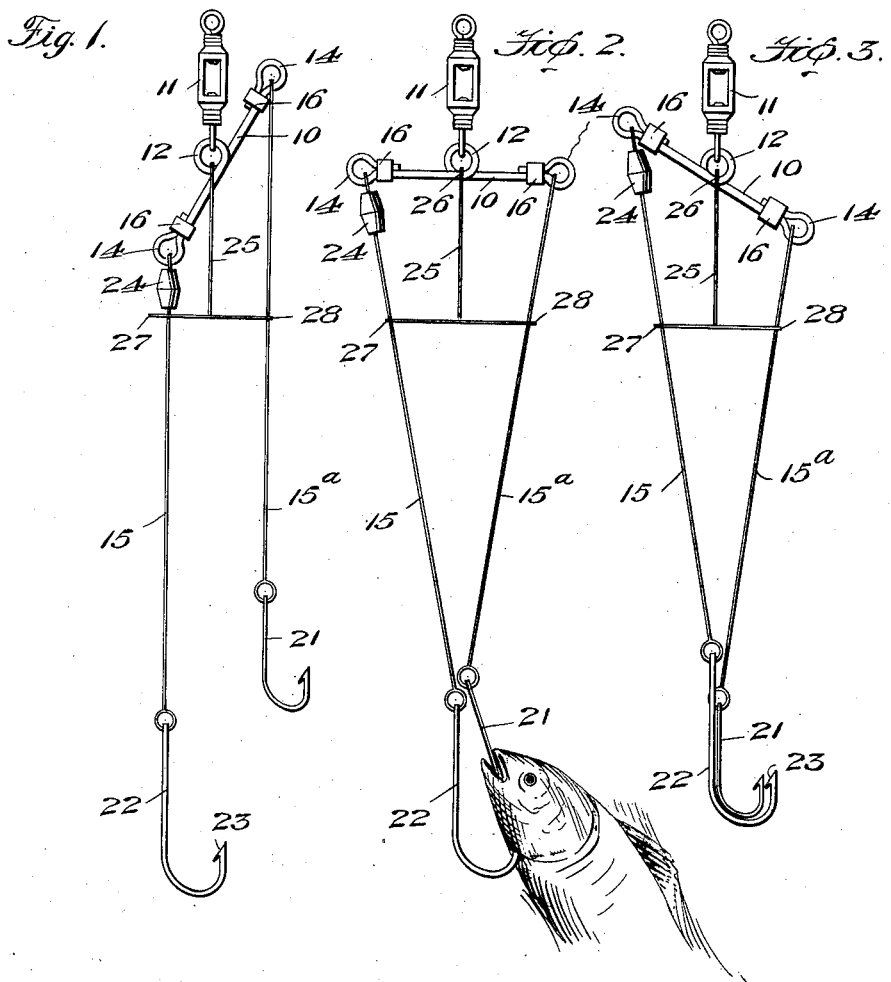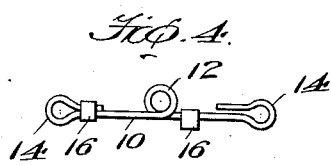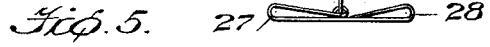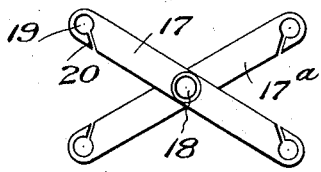

JAMES H. CLARK, OF LOS ANGELES, CALIFORNIA.

FISH-HOOK.

1,100,055. Specification of Letters Patent. Patented June 16, 1914.

Application filed January 11, 1913. Serial No. 741,557.

*To all whom it may concern:*

Be it known that I, JAMES H. CLARK, a citizen of the United States, residing at Los Angeles, in the county of Los Angeles and State of California, have invented certain new and useful Improvements in Fish-Hooks; and I do hereby declare the following to be a full, clear, and exact description of the invention, such as will enable others skilled in the art to which it appertains to make and use the same.

This invention is a fish hook, relating more especially to double or combined hooks.

One object of the invention is to secure fish which fail to become impaled on the bait hook.

A further purpose of the invention is to provide a device which can be used on hand lines, and which is also applicable to other lines which are raised at periods, such as trot lines.

Another object of the invention is to provide a hook which will automatically resume its set position should the nibble on the baited hook be insufficient to move the gaff-hook into operative position, sufficient to engage a part of the fish.

The invention consists in providing a plurality of hooks, so mounted upon an equalizer, or supporting member, that they may have movement relative to each other, one of said hooks serving as a bait hook, while another of the hooks serves the purpose of a gaff-hook, the coöperative movement of said hooks being so controlled that the barbs thereof will engage at substantially a common point. The device is provided, also, with means for automatically restoring the hooks to their initial or set position.

The invention consists further in the combination and arrangement of parts more fully hereinafter described and claimed, whereby the hooks and their connecting means are interchangeably or removably mounted upon the equalizer or supporting member.

In the drawings, I have illustrated a practical embodiment of the invention, but the constructions shown therein are to be understood as illustrative only, and not as defining the limits of the invention.

Figure 1 illustrates the invention with the hooks in their set position. Fig. 2 is an illustration of the operation of the invention. Fig. 3 shows the position of the parts when the bait hook is drawn into substantially horizontal alinement with the gaff-hook. Fig. 4 is a detail view of the equalizer or supporting member with one of the retaining means out of position. Fig. 5 is a detail view of another embodiment of the supporting member. Fig. 6 is a perspective view of the guiding element.

In the embodiment of the invention disclosed in the drawings, I have illustrated the equalizer or supporting member 10 as suspended from a swivel 11, of any preferred construction, at a point substantially at the central portion of the equalizer, said swivel 11 being connected to an ordinary fishing line 13. The supporting member 10 may be of any suitable material or form, and is shown in Fig. 1 as a wire bent to form the central ring 12, and having hooks 14 at the ends of the member for the reception of connecting members or snoods 15, 15$^a$ for the hooks. The passage to the supporting hooks 14 is closed by a sleeve 16 slidably mounted upon the member 10, which sleeve operates to engage the body of the member and the end of the hook, thereby preventing the loop of the snood 15 from becoming disengaged from hook 14. This construction permits of the interchangeability of different size hooks upon the fishing device. In the embodiment of the supporting member disclosed in Fig. 5, the supporting member is composed of two plates 17, 17$^a$ pivoted together at 18, which also serves the purposes of the supporting ring 12 of Fig. 1. The ends of these plates are provided with apertures 19 which are provided with a slot 20 from the aperture to the edge of the plate. The slot 20 of plate 17 is positioned opposite to the slot 20 of plate 17$^a$, whereby when the loop of a snood is placed in alinement with said slots 20, the pivotal movement of plates 17, 17$^a$ to bring apertures 19 in register, will guide the loop of the snood into position in aperture 19 and lock the same in said position.

The snood or connecting member 15$^a$ is preferably shorter in length than the connecting member 15, and this shorter member carries a hook 21 which is designed as a bait hook. The member 15 is provided, also, with a hook 22, preferably larger than hook 21, said hook 22 serving as a gaff-hook. This latter hook is so mounted that its barb 23 will be directed toward hook 21. This is accomplished by constructing the connecting members 15, 15ª of fine wire, although it is to be understood that the right is reserved to construct these members of any other suitable material. In order to maintain the gaff-hook 22 in its operative position below the bait hook 21, I have provided a weight 24 upon the connecting member 15, or the hook, as may be desired, although it is obvious that said member may be omitted should the hook 22 be sufficiently large to overcome the counterweight of the hooks on the other side of the equalizer or member 10.

One important feature of the invention resides in controlling the automatic movement of the gaff-hook into substantially the same position to which the bait hook may be drawn by a fish when "nibbling" at the bait, whereby the impaling of the fish upon one or the other of the hooks is accomplished. One means of accomplishing this result is disclosed in the drawings wherein a guiding element 25 is placed in engagement with the snoods or connecting members 15, 15ª. One construction of this guiding element is shown in the drawings as an inverted T-shaped member suspended from the central supporting ring 12 of the member 10 for free swinging movement relative thereto. This guiding element is shown constructed of wire bent upon itself to form the attaching loop 26, and the cross loops 27, 28, the loop 27 serving to guide the movement of snood 15, while the loop 28 engages the snood 15ª. The length of the horizontal portion of the member 25 is substantially less than the length of the supporting member 10, whereby when the supporting member is moved to a horizontal position, the lower ends of the snoods or connecting members 15, 15ª are directed toward each other until the upper ends of the hooks 20, 21 are substantially in the same horizontal plane. The loops 27, 28, permit of the transverse movement of the members 15, 15ª, away from each other for a substantial distance prior to directing the ends of the members toward each other.

In operation, the bait is placed upon hook 21, and the parts assume the positions illustrated in Fig. 1, wherein the connecting members 15, 15ª are substantially parallel to each other and the supporting member 10 is moved to a nearly vertical position. As a fish attempts to remove the bait from the hook 21, the pulling action on said hook moves member 10 upon its pivot at 12 and draws the gaff-hook 22 into substantially the position assumed by hook 21, by means of the guiding element 25. The efforts of the fish to disengage himself will either impale the fish upon hook 21 or 22, or both. Moreover, the device is especially adapted for catching fish larger than is intended by the employment of the ordinary size bait hook. Should a small bait hook be employed for catching a species of fish which never grow to large proportions, and a large fish siezes the bait on such small hook, the gaff-hook will operate to impale the larger fish, as will be readily understood.

Having thus fully described my invention, what I claim as new and desire to secure by Letters Patent, is:

1. In a device of the class described, an elongated supporting member, a plurality of hooks depending therefrom, and a guiding element suspended from the supporting member.

2. In a device of the class described, an elongated supporting member, a plurality of connecting members carried thereby, hooks depending from said connecting members, and an elongated guiding element suspended from the supporting member and coöperating with said connecting members.

3. In a device of the class described, an elongated supporting member, means substantially central of the member for suspending the same, a plurality of hooks, members connecting said hooks with the ends of the supporting member, and a guide-element for the connecting members.

4. In a device of the class described, an elongated supporting member capable of movement with reference to its means of suspension, connecting members depending from the ends of the supporting member, a plurality of hooks carried by the connecting members, and an elongated guiding element coöperating with the connecting members, said guiding-element being shorter than the supporting member, whereby the hooks are drawn into coöperating positions.

5. In a device of the class described, an elongated supporting member capable of movement with reference to its means of suspension, connecting members depending from the ends of the supporting member, a plurality of hooks carried by the connecting members, a weight carried by one of said hooks, and a guiding-element suspended from the supporting member and engaging the connecting members.

6. In a device of the class described, an elongated supporting member comprising central suspending means and retaining means near each end thereof, connecting members each depending from the supporting member and carrying a barbed hook, and a guiding-element suspended from the central suspending means of the supporting member and engaging the connecting members.

7. In a device of the class described, an elongated supporting member comprising central suspending means, hooks at each end thereof, and a sleeve carried by the supporting member for closing the ends of said hooks, connecting members depending from the hooks of the supporting member, each of said connecting members carrying a barbed hook, and a guiding element coöperating with the connecting members for controlling the movement of said barbed hooks.

In testimony whereof, I affix my signature, in presence of two witnesses.

JAMES H. CLARK.

Witnesses:
I. W. BAKER,
J. A. EASTLICK.